(12) United States Patent
Yamamoto

(10) Patent No.: US 6,215,209 B1
(45) Date of Patent: Apr. 10, 2001

(54) SMALL-SIZED MOTOR EQUIPPED WITH WORM GEAR REDUCER AND METHOD OF MANUFACTURING THE SAME

(75) Inventor: Kazuyuki Yamamoto, Matsudo (JP)

(73) Assignee: Mabuchi Motor Co., Ltd. (JP)

( * ) Notice: Subject to any disclaimer, the term of this patent is extended or adjusted under 35 U.S.C. 154(b) by 0 days.

(21) Appl. No.: 09/463,058

(22) PCT Filed: May 13, 1999

(86) PCT No.: PCT/JP99/02487

§ 371 Date: Jan. 14, 2000

§ 102(e) Date: Jan. 14, 2000

(87) PCT Pub. No.: WO99/59235

PCT Pub. Date: Nov. 18, 1999

(30) Foreign Application Priority Data

May 14, 1998 (JP) .................................................. 10-130929

(51) Int. Cl.[7] .............................. H02K 7/08; H02K 15/14
(52) U.S. Cl. ................................. 310/42; 310/43; 310/90; 310/75 R; 29/596
(58) Field of Search ......................................... 310/90, 75 R, 310/43, 42; 384/909, 911, 912, 913; 29/596

(56) References Cited

U.S. PATENT DOCUMENTS

| | | | |
|---|---|---|---|
| 4,263,361 | * | 4/1981 | Hodes et al. .......................... 428/240 |
| 5,144,738 | * | 9/1992 | Oyafuso ................................ 310/42 |
| 5,401,574 | * | 3/1995 | Masutani et al. .................... 428/338 |

FOREIGN PATENT DOCUMENTS

| | | | |
|---|---|---|---|
| 53-70301 | 6/1978 | (JP) | ................................. H02K/5/16 |
| 60-11536 | 3/1985 | (JP) | ............................... H02K/15/00 |
| 7-106044 | 11/1985 | (JP) | ................................. H02K/5/16 |
| 61-56701 | 12/1986 | (JP) | ................................. H02K/5/00 |
| 8-98448 | 4/1996 | (JP) | ................................. H02K/5/16 |
| 9-327153 | 12/1997 | (JP) | ............................... H02K/7/116 |

* cited by examiner

*Primary Examiner*—Burton Mullins
(74) *Attorney, Agent, or Firm*—McGlew and Tuttle, P.C.

(57) ABSTRACT

A small-sized motor equipped with a worm reducer according to the present invention includes a cavity portion 10 formed in a gear case 17, which accommodates a worm 6 mounted on a motor shaft 4 and a worm wheel 7. The cavity portion 10 receives a front end of the motor shaft 4 and does not communicate with the exterior thereof. A bearing holder 22 holding a bearing device is disposed in the cavity portion 10 such that a metallic-fiber-containing resin spacer or metallic spacer 30 is disposed between the bearing holder 22 and the gear case 17. Thrust adjustment for the motor shaft 4 is performed through application of thrust to the motor shaft 4 after the resin spacer is softened through induction heating effected electromagnetically from outside the gear case, or after a gear case protrusion, which is in contact with the metallic spacer, is softened through application of heat transmitted from the metallic spacer heated through induction heating effected electromagnetically from outside the gear case. Thus, the motor shaft can be fixedly positioned accurately with respect to the thrust direction.

13 Claims, 7 Drawing Sheets

Prior Art

Fig. 9

Prior Art

Fig. 10

Prior Art

Detail of portion A

SMALL-SIZED MOTOR EQUIPPED WITH WORM GEAR REDUCER AND METHOD OF MANUFACTURING THE SAME

TECHNICAL FIELD

The present invention relates to a small-sized motor equipped with a worm gear reducer used to drive, for example, electric equipment of an automobile, such as a power window apparatus, as well as to a method of manufacturing the same.

BACKGROUND ART

Figure 8:
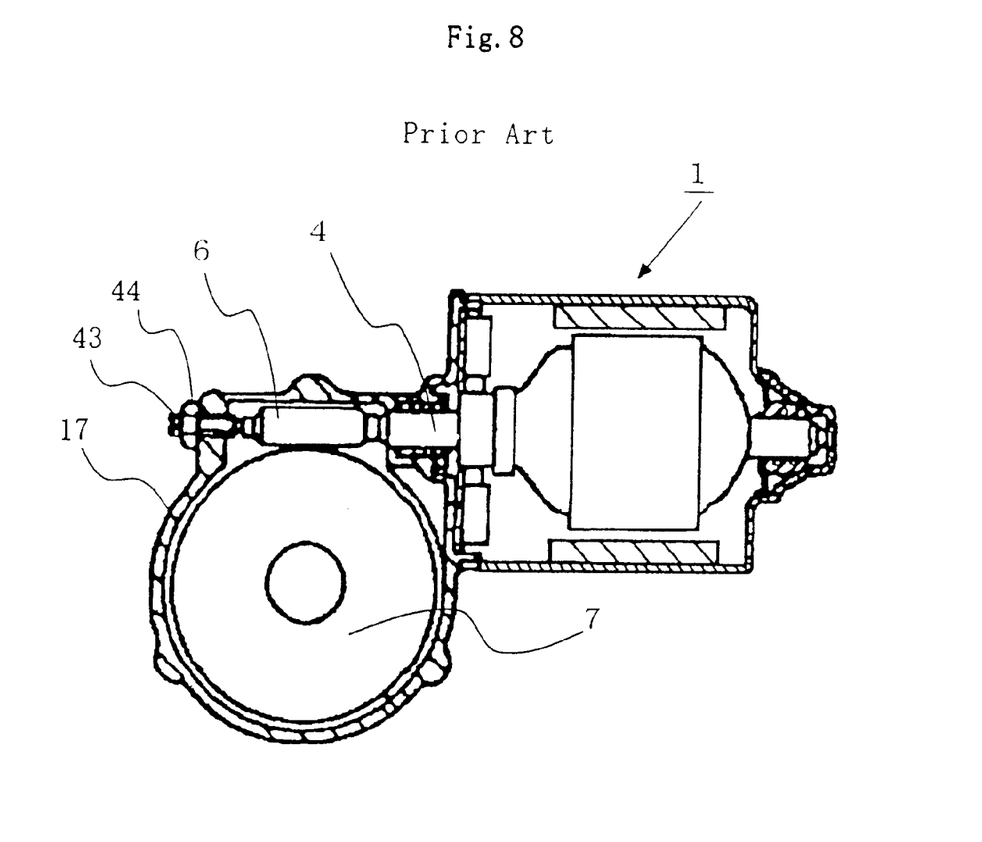
FIG. 8 is a sectional view of a conventional bearing device for a motor shaft.

Conventionally, the position with respect to the thrust direction of the shaft of a small-sized motor equipped with a worm gear reducer is fixed, for example, as shown in FIG. 8 (Japanese Patent Publication (kokoku) No. 60-11536/1985). Reference numeral 1 denotes a motor body; reference numeral 6 denotes a worm coupled with a motor shaft 4; and reference numeral 7 denotes a worm wheel engaged with the worm 6. As shown in FIG. 8, an adjustment screw 43 is attached to a gear case 17 at a position corresponding to a front end portion of the motor shaft 4. After thrust is adjusted by means of the adjustment screw 43, the adjustment screw 43 is fixed by means of a nut 44. In thrust adjustment, the motor is rotated, while a specially machined front end of the adjustment screw 43 is brought in contact with the end of the motor shaft 4. While a no-load current of the motor is being observed, the adjustment screw 43 is positioned where the no-load current assumes a value as small as possible and the motor shaft 4 has no play in the thrust direction. The adjustment screw 43 is fixed in the position by means of tightening the nut 44. Such a manner of fixation of the motor shaft 4 with respect to the thrust direction requires skill in fixing the adjustment screw 43 and the nut 44 together, thus consuming much time.

Japanese Patent Publication (kokoku) No. 60-11536/1985 also discloses a technique for positioning with respect to the thrust direction by use of a spacer to be heated through electromagnetic induction. In addition to a shaft insertion hole, a square hole is provided. The spacer is inserted through the square hole and toward the front end portion of the shaft. The front end portion of the shaft is brought into direct contact with the spacer and is heated through electromagnetic induction. The front end portion of the shaft is then pressed against the softened spacer to thereby be positioned with respect to the thrust direction.

Since this positioning mechanism requires formation of the square hole in addition to the shaft insertion hole, an associated gap may allow entry of water from the outside. Also, frictional heat generated through shaft rotation during motor operation or heat generated from windings and a commutator during motor operation is transmitted to the spacer through the shaft, potentially re-softening the spacer. Further, since the spacer by itself bears a radial force and a thrust force, wear or breakage of the spacer is likely to cresent a problem.

Figure 9:
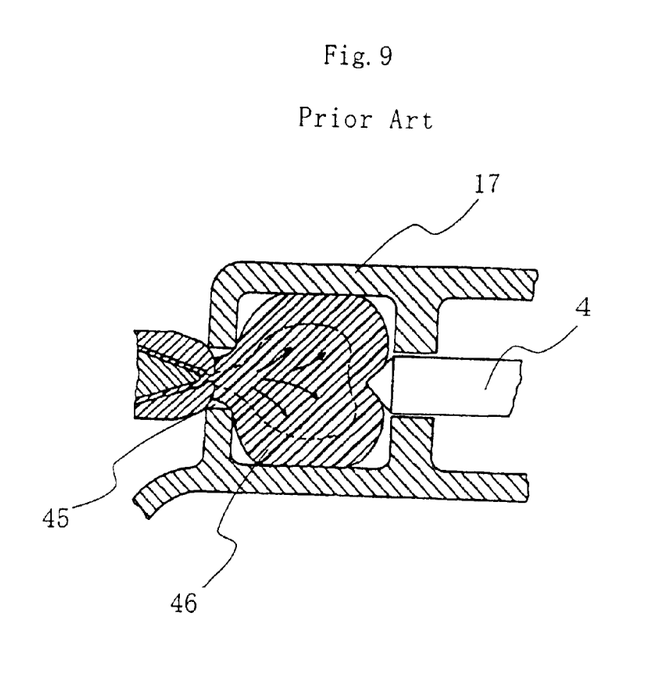
FIG. 9 is a sectional view of another conventional bearing device for a motor shaft.
Figure 10:
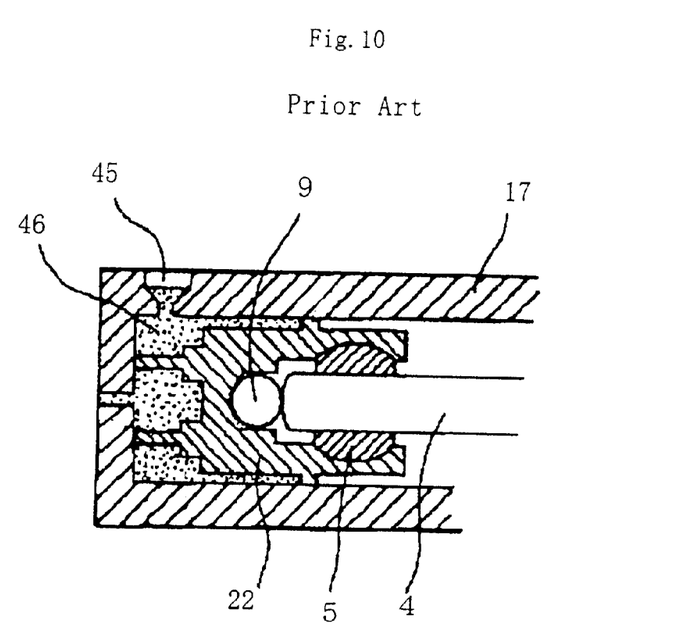
FIG. 10 is a sectional view of a further conventional bearing device for a motor shaft.

Other conventional techniques for fixing a motor shaft with respect to the thrust direction include the following. As shown in FIG. 9, resin 46 is injected into a cavity portion located between a gear case 17 and a motor shaft 4 through an injection inlet 45 extending between the cavity portion and the exterior of the gear case 17, thereby fixing the position of the motor shaft 4 with respect to the thrust direction (Japanese Patent Publication (kokoku) No. 61-56701/1986). Similarly, as shown in FIG. 10, the resin 46 is injected into a cavity portion located between the gear case 17 and a bearing holder 22 equipped with a bearing device (radial bearing 5 and steel ball 9) for the motor shaft 4, through the injection inlet 45 extending between the cavity portion and the exterior of the gear case 17, thereby fixing the position of the motor shaft 4 with respect to the thrust direction (Japanese Patent Publication (kokoku) No. 7-106044/1995).

Such resin-injection practice requires labor and time for curing of the applied resin. Also, deformation, such as shrinkage, or time-course change of the resin causes a decrease in adhesion between the resin and the gear case with a resultant formation of a gap between the resin and the gear case at an injection inlet portion. Water may enter the gear case through the gap from the outside.

A certain kind of resin may require control of injection pressure or injection temperature. In the case of a resin that requires mixture and reaction of two components before use, a mixing process requires labor, and resin control must be performed before and after the mixing process. In addition, at the time of resin injection, the amount of resin to be injected must be controlled or adjusted, and care must be taken in order to prevent mixing of bubbles into the resin. In a configuration where resin to be used directly supports a motor shaft, a problem may arise due to wear or breakage of the resin caused by a thrust of the motor shaft.

DISCLOSURE OF THE INVENTION

An object of the present invention is to solve the above problems and to provide a small-sized motor equipped with a worm reducer capable of being easily assembled, enabling accurate fixation of the position of a motor shaft with respect to the thrust direction, and capable of preventing entry of water from the outside to thereby avoid potential quality-related troubles and impart high reliability as well as to provide a method of manufacturing the motor.

To achieve the above object, the present invention provides a small-sized motor equipped with a worm reducer and a method of manufacturing the same, in which a cavity portion 10 for receiving a front end of a motor shaft 4 is formed in a gear case 17, which accommodates a worm 6 connected to the motor shaft 4 and a worm wheel 7 engaged with the worm 6, such that the cavity portion 10 does not communicate with the exterior of the gear case 17. In the cavity portion 10 are disposed a bearing holder 22 including a radial bearing 5 and a thrust bearing for the motor shaft 4, and a spacer 30 formed of a metallic-fiber-contraining resin, which is located on the side of the bearing holder 22 opposite the motor shaft 4 and is disposed between the bearing holder 22 and the gear case 17. The spacer 30 is softened through electromagnetic induction heating.

The present invention further provides a small-sized motor equipped with a worm reducer and a method of manufacturing the same, characterized in that a metallic spacer to be heated through electromagnetic induction is used as the spacer 30 in place of a resin spacer and that a protrusion 33 abutting the spacer 30 is formed on the inside of the gear case 33 and is crushed after being softened through application of heat transmitted from the abutting heated spacer 30.

Thrust adjustment for the motor shaft 4 is performed through application of thrust to the motor shaft 4 after the resin spacer is softened through induction heating effected electromagnetically from outside the gear case, or after the gear case protrusion 33, which is in contact with the metallic spacer, is softened through application of heat transmitted from the metallic spacer heated through induction heating effected electromagnetically from outside the gear case.

As described above, except for reception of the bearing holder 22, the gear case cavity portion 10 does not communicate with the exterior thereof through, for example, a through-hole, thereby maintaining positional accuracy of the motor shaft 4 with respect to the thrust direction and preventing movement of the motor shaft 4 with respect to the thrust direction.

The present invention is applicable to an actuator operated by a small-sized motor equipped with a worm reducer and to a method of manufacturing the actuator. The actuator comprises an actuator box 40 which accommodates and supports the small-sized motor equipped with a worm reducer. The actuator box 40 includes a spacer holder portion 44, which is formed on the inner wail of the actuator box 40 at a position corresponding to the front end portion of the shaft of a small-sized motor 1 supported within the actuator box 40. A metallic-fiber-containing resin spacer 30 is pressed into the spacer holder portion 44 against the motor shaft 4. The resin spacer 30 is softened through induction heating effected by means of an electromagnetic induction coil 31 disposed outside the actuator box 40 to thereby be released from the pressed condition.

BRIEF DESCRIPTION OF DRAWINGS

FIG. 4(*a*) is a view illustrating insertion of a spacer and a bearing holder into a cavity portion; and FIG. 4(*b*) is a sectional view taken along line IVB—IVB of FIG. 4(*a*);

BEST MODE FOR CARRYING OUT THE INVENTION

Figure 1:
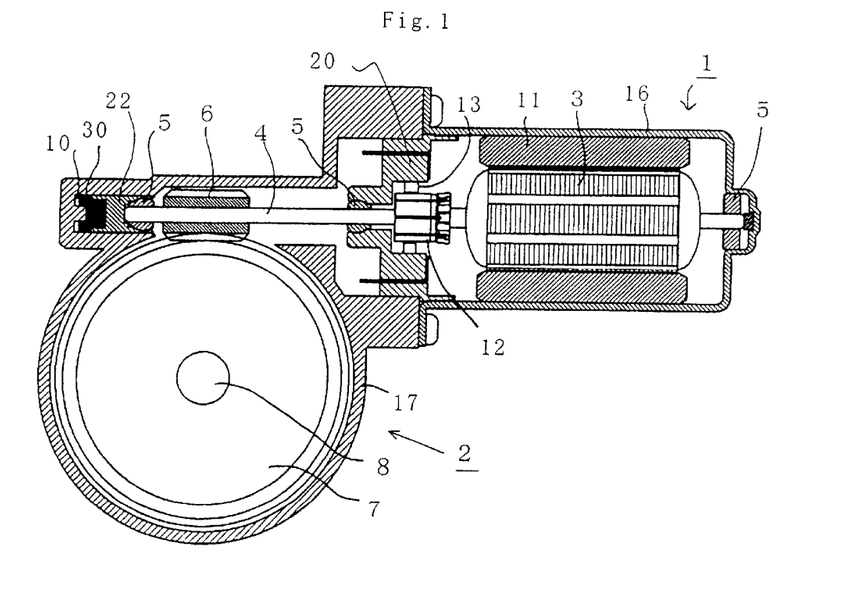
FIG. 1 is a longitudinal sectional view of a small-sized motor equipped with a worm reducer to which the present invention is applied.
Figure 2:
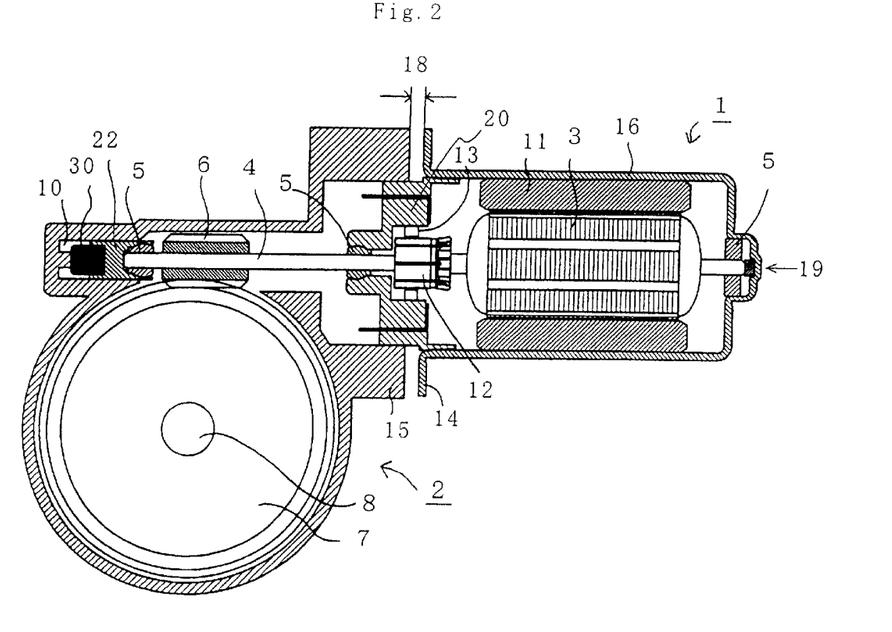
FIG. 2 is a longitudinal sectional view of a small-sized motor equipped with a worm reducer according to the present invention, showing a state before adjustment.

FIGS. 1 and 2 are schematic longitudinal sectional views of a small-sized motor equipped with a worm reducer to which the present invention is applied. FIG. 1 shows a state after thrust adjustment is performed for a motor shaft, whereas FIG. 2 shows a state before thrust adjustment is performed.

In FIGS. 1 and 2, reference numeral 1 denotes a motor body. A speed reducer 2 is connected to the motor body 1. The motor body 1 assumes a conventional structure except for the structure of a bearing portion located at a front end of a motor shaft 4 and on the gear case side. The motor body 1 includes a rotor 3 and a commutator 12, which are mounted on the motor shaft 4, a motor case 16 having a magnet 11 attached to its inner surface, an end bell 20 fitted to the motor case 16 so as to close an opening portion thereof, a brush 13 attached to the end bell 20, and electrical terminals for the brush 13. The motor shaft 4 is supported by three radial bearings 5 located at its opposite end portions and central portion.

The speed reducer 2 includes a worm 6 mounted on the motor shaft 4, a worm wheel 7 engaged with the worm 6, an output shaft (or output gear) 8 extending from the center of the worm wheel 7, and a gear case 17. The output shaft 8 is connected to, for example, a power window device for automobile use. As will be described later, a front end portion of the motor shaft 4 is supported with respect to the thrust direction by the bearing holder 22 and is also supported in the radial direction by the bearing holder 22 through the radial bearing 5. That is, the radial bearing 5 is fixedly inserted into the bearing holder 22.

A cavity portion 10 is formed between the bearing holder 22 and the gear case 17. The cavity portion 10 has a bottom, permitting only unidirectional insertion of the shaft 4, the bearing holder 22, and a spacer 30 therein from the side of the motor body 1. As shown in FIG. 2, which shows a state before thrust adjustment, the spacer 30 is inserted beforehand into the cavity portion 10. The spacer 30 is formed of resin to be heated and softened through, or formed of metal to be heated through, electromagnetic induction heating (or radio-frequency heating). The spacer 30 is inserted into the cavity portion 10 in the following manner. The spacer 30 and the radial bearing 5 are attached to the bearing holder 22. The resulting assembly is attached to a front end of the shaft 4 of the motor body 1. Subsequently, the motor body 1 and the speed reducer 2 are assembled into a single unit as shown in FIG. 2. The dimension of the spacer 30 is determined such that a gap 18 is formed between a coupling end portion 14 of the motor case 16 and a coupling end portion 15 of the gear case 17. In this state, the spacer 30 is heated instantaneously through electromagnetic induction, and a bottom portion of the motor case 16 is pressed in the direction of arrow 19 until the coupling end portion 14 of the motor case 16 and the coupling end portion 15 of the gear case 17 are coupled together so that the gap 18 is eliminated. The coupled coupling end portions 14 and 15 are fixed together by means of screws, thus completing the assembly work. FIG. 1 shows a state of completed assembly.

This thrust adjustment will be further described with reference to FIGS. 3 to 7, which show enlarged views of a bearing portion of the shaft 4. In FIGS. 3 to 7, reference numeral 31 denotes an electromagnetic induction coil; reference numeral 30 denotes a spacer; reference numeral 10 denotes a cavity portion; and reference numeral 22 denotes a bearing holder.

Figure 3A:
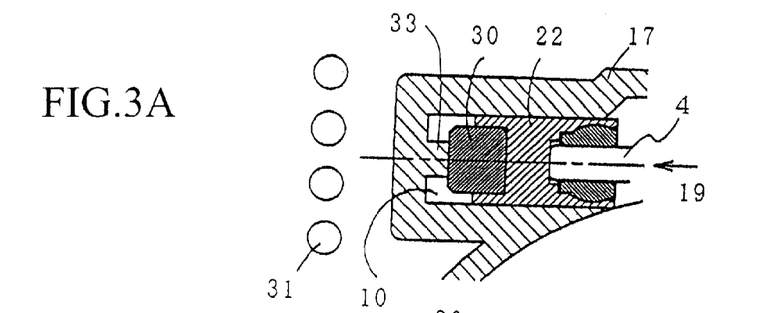
FIGS. 3A and 3B are enlarged views showing an example of a bearing device according to the present invention, representing the case where a steel ball is not employed.
Figure 3B:
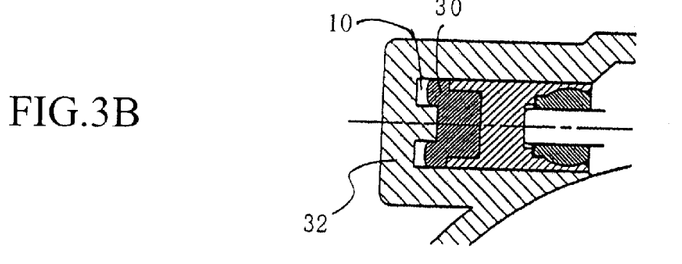

FIG. 3A shows a state before thrust adjustment, whereas FIG. 3B shows a state after thrust adjustment. The shaft 4 is directly supported with respect to the thrust direction by the bearing holder 22 without use of a steel ball in contrast to the case of FIG. 5, which will be described later. The outer surface of the bearing holder 22 and the inner wall of the gear case 17, which are in contact with each other, conventionally assume a circular shape. A protrusion 33 is formed on the inside of a gear case bottom portion 32 in order to support the spacer 30 with respect to the thrust direction in the cavity portion 10. In this example, the spacer 30 is formed of resin which contains fine, short metallic fibers.

In order to carry out thrust adjustment through heating and softening of the spacer 30, the electromagnetic induction coil 31 is disposed on the side of the gear case bottom portion 32 as illustrated. In this state, when current is applied to the electromagnetic induction coil 31, the metallic-fiber-containing resin spacer 30 is heated and softened, whereas the bearing holder 22 and the gear case 17, both of which are simply formed of resin, are not heated. At this time, application of a force in the direction of the arrow 19 causes the thermally softened spacer 30 to deform and enter a depression formed around the protrusion 33, and the shaft 4 becomes movable toward the spacer 30 and thus can be positioned with respect to the thrust direction.

Figure 4A:
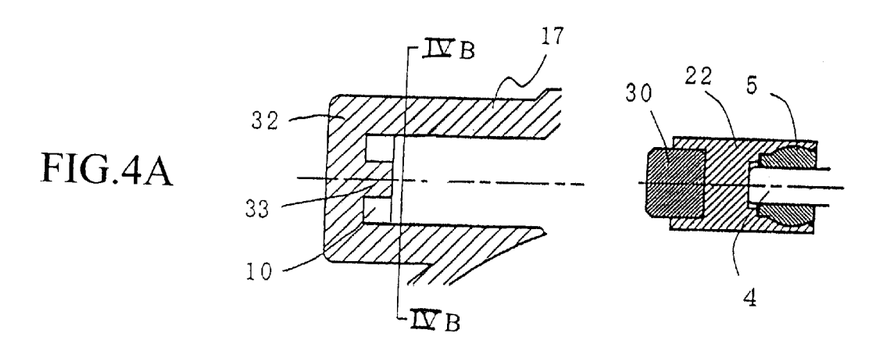
Figure 4B:
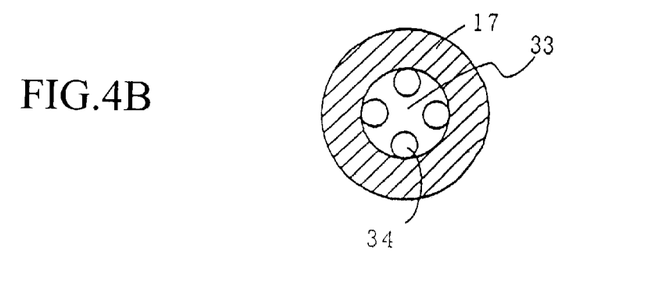

FIG. 4(*a*) is a view for explaining insertion of the spacer 30 into the cavity portion 10. FIG. 4(*b*) is a sectional view taken along line IVB—IVB of FIG. 4(*a*). As described previously, the spacer 30 and the radial bearing 5 are attached to the bearing holder 22. The resulting assembly is attached to a front end of the shaft 4, followed by insertion into the cavity portion for assembly. The protrusion 33 formed on the bottom portion 32 of the gear case 17 may assume a form as illustrated. Specifically, as shown in FIG. 4(*b*), for example, four circular depressions 34 may be formed symmetrically to thereby form a relatively projecting protrusion 33. This feature enables more stable support of the spacer 30.

After insertion of the spacer 30 into the cavity portion 10 and before start of heating, a gap must be present around the spacer 30. Otherwise, thrust adjustment would be disabled even though the spacer 30 is melted or softened and is subjected to a pressing force. This gap essential to thrust adjustment may be provided, for example, through selection of the shape of the spacer 30 or the bearing holder 22. Preferably, the protrusion 33 is formed on the bottom portion 32 of the gear case 17 so as to support the spacer 30 with respect to the thrust direction and to enable formation of a depression into which an excess portion of the thermally softened spacer 30 enters.

Figure 5A:
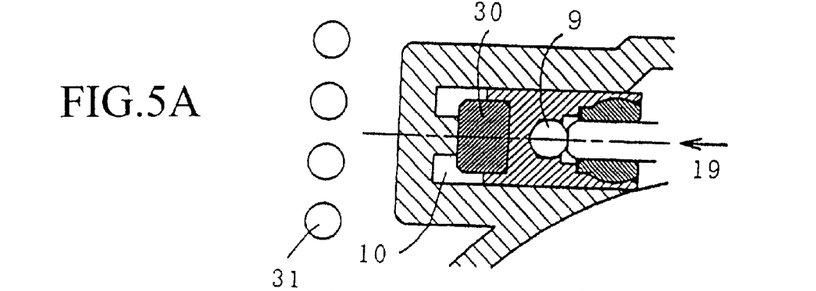
FIGS. 5A and 5B are enlarged views showing another example of a bearing device according to the present invention, representing the case where a steel ball is employed.
Figure 5B:
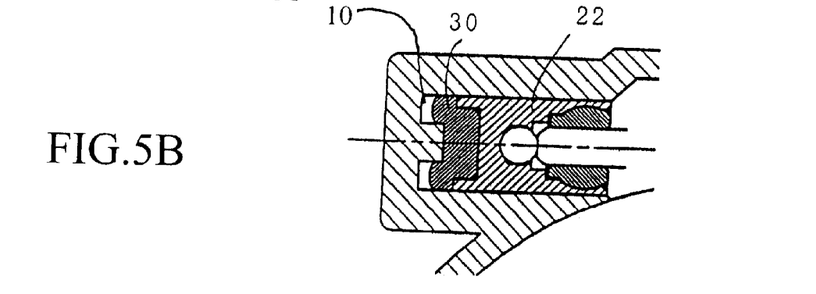

FIG. 5 shows another example of the present invention different from that of FIG. 3. FIG. 5A shows a state before thrust adjustment, whereas FIG. 5B shows a state after thrust adjustment. The bearing holder 22 includes a steel ball 9 for supporting the shaft 4 with respect to the thrust direction. The structure of FIG. 5 operates and enables positioning of the shaft 4 with respect to the thrust direction as does the structure of FIG. 3 except that the shaft 4 is supported with respect to the thrust direction by the steel ball 9.

Figure 6A:
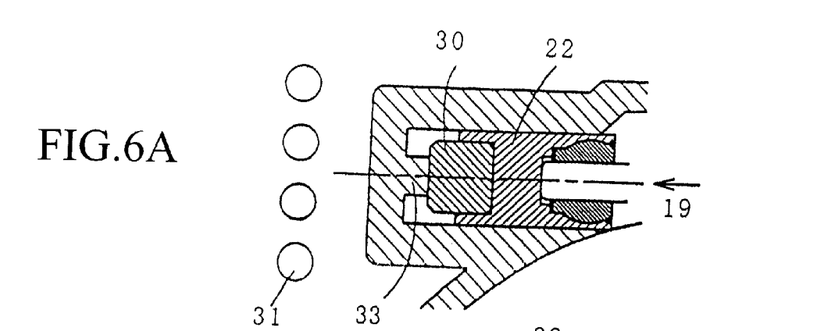
FIGS. 6A and 6B are enlarged views showing still another example of a bearing device according to the present invention, representing the case where a steel ball is not employed and a metallic spacer is employed.
Figure 6B:
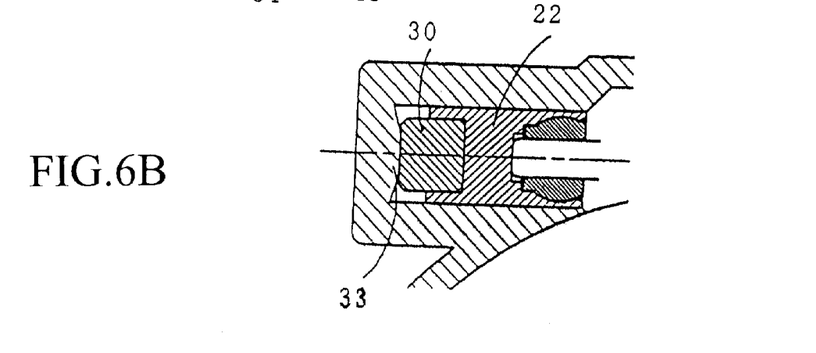

FIG. 6 shows still another example of the present invention. FIG. 6A shows a state before thrust adjustment, whereas FIG. 6B shows a state after thrust adjustment. The spacer 30 is formed of metal in place of resin. As in the case of FIGS. 3 and 5, the electromagnetic induction coil 31 is disposed on the side of the gear case bottom portion. When current is applied to the electromagnetic induction coil 31, the metallic spacer 30 is heated, but the metallic spacer 30 itself is not melted or softened. The gear case protrusion 33 in contact with the heated metallic spacer 30 is softened. At this time, when a force is applied in the direction of the arrow 19, the gear case protrusion 33 is crushed as illustrated, so that the shaft 4 can be moved to the right in FIG. 6 for positioning of the shaft 4 with respect to the thrust direction. In this case, the gear case protrusion 33 and the bearing holder 22 can be formed of resin. However, the melting point (softening temperature) of the gear case protrusion 33 is rendered lower than that of the bearing holder 22, whereby only the gear case protrusion 33 can be softened. The gear case protrusion 33 may be formed of, for example, a PBT resin (polybutylene terephthalate; melting point 220° C.), whereas the bearing holder 22 may be formed of, for example, a PA resin (polyamide; melting point 260° C.).

Figure 7A:
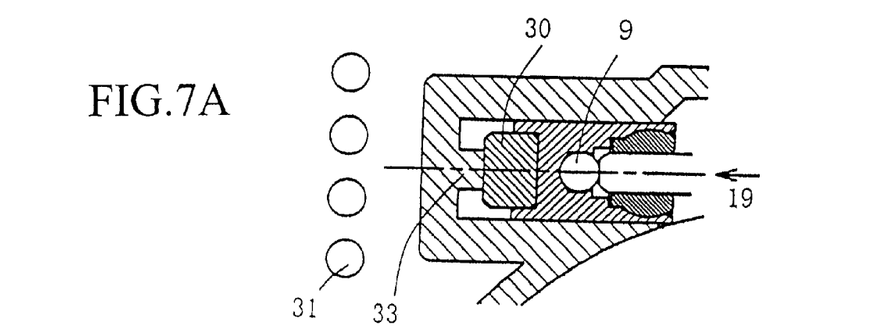
FIGS. 7A and 7B are enlarged views showing a further example of a bearing device according to the present invention and similar to that of FIG. 6, representing the case where a steel ball is employed.
Figure 7B:
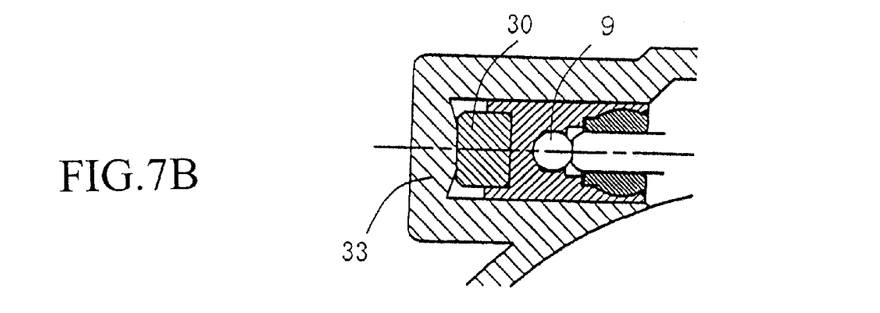

FIG. 7 shows a further example of the present invention, which is similar to that of FIG. 6. FIG. 7A shows a state before thrust adjustment, whereas FIG. 7B shows a state after thrust adjustment. The bearing holder 22 includes the steel ball 9 for supporting the shaft 4 with respect to the thrust direction. The structure of FIG. 7 operates and enables positioning of the shaft 4 with respect to the thrust direction as does the structure of FIG. 6 except that the shaft 4 is supported with respect to the thrust direction by the steel ball 9.

Figure 11:
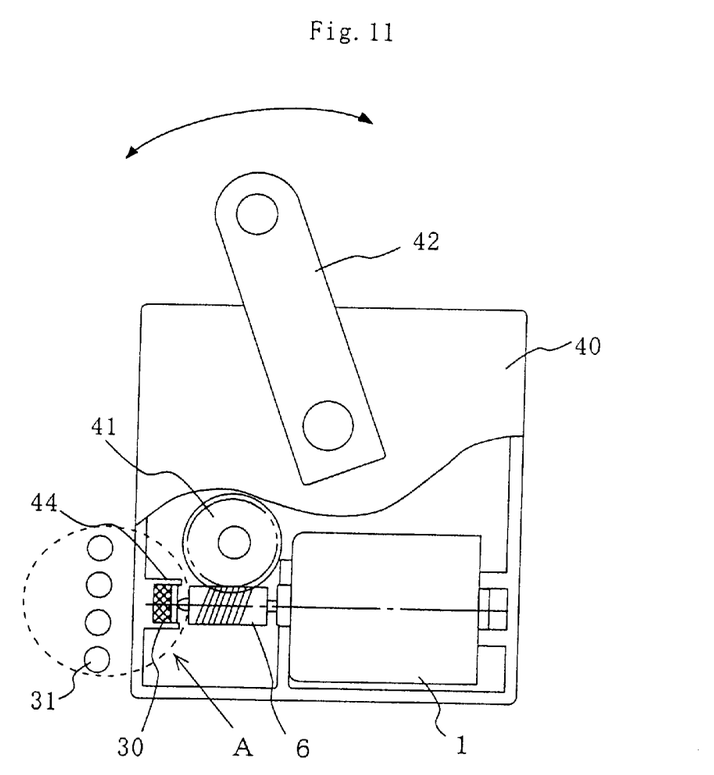
FIG. 11 is a view showing an example of application of the present invention to an actuator for electric equipment for automobile use.

FIG. 11 exemplifies application of the present invention to an actuator, for example, an actuator for electric equipment for automobile use, such as an actuator for an air conditioner damper. In FIG. 11, reference numeral 40 denotes an actuator box for accommodating and supporting a small-sized motor equipped with a worm reducer. Specifically, a motor 1 and a worm reducer mechanism are supported within the actuator box 40. A worm 6 is fixedly attached to the shaft of the motor 1. The front end portion of the shaft is supported by a shaft bearing portion, which is formed on the inner wall of the actuator box 40 at the corresponding position. The actuator box 40 contains a plurality of reduction gears 41 (only one of them is shown), which rotate while engaging with the worm 6. An output shaft of a last-stage reduction gear extends to the exterior of the actuator box 40 and is fixedly attached to one end of a lever 42. When the motor 1 rotates, the lever 42 is swung as represented by the arrow of FIG. 11 according to the direction of motor rotation. The thus-operating lever 42, for example, opens or closes an air discharge port of an automobile air conditioner. During this operation, if the motor shaft 4 has thrust play, unusual noise is produced. However, as will be described later, the shaft bearing portion, which characterizes the invention, enables elimination of thrust play.

Figure 12:
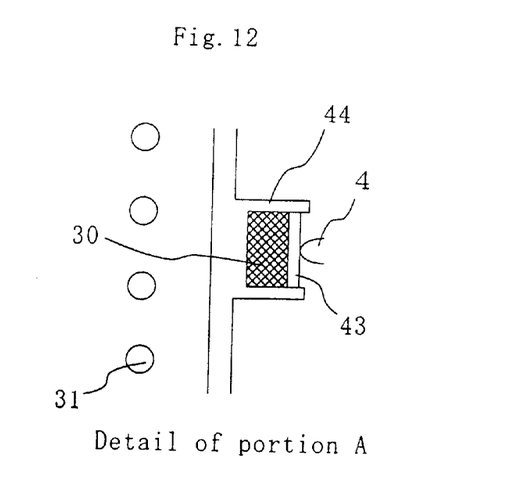
FIG. 12 is an enlarged view showing in detail a shaft bearing portion marked with letter A of FIG. 11.

FIG. 12 is an enlarged view of portion A encircled by a dotted line and shows in detail the shaft bearing portion for supporting the front end portion of the shaft of the motor with respect to the thrust direction. In FIG. 12, reference numeral 30 denotes a cylindrical resin spacer which contains metallic fibers; reference numeral 43 denotes a disk-like thrust washer inserted as needed between the resin spacer 30 and the motor shaft 4 in order to support a front end portion of the motor shaft 4; reference numeral 44 denotes a cylindrical spacer holder portion formed on the inner wall of the actuator box 40 and adapted to support the resin spacer 30 and the thrust washer 43.

In assembly, the motor 1 is set at a predetermined position within the actuator box 40. The spacer 30 and the thrust washer 43 are inserted into the spacer holder portion 44 and against the motor shaft 4. That is, the spacer 30 and the thrust washer 43 are inserted under pressure between the motor shaft 4 and the bottom portion of the spacer holder portion 44. Subsequently, current is applied to the electromagnetic induction coil 31 disposed outside the actuator box 40 to thereby heat and soften the metallic-fiber-containing resin spacer 30. Thus, the spacer 30 is released from the pressed condition, thereby holding the motor 1 in a state free from thrust play.

As described previously with reference to FIG. 3, if no gap is present around the spacer 30, thrust adjustment will be disabled even though the spacer 30 is melted or softened and is subjected to a pressing force. As in the case of FIG. 3, through formation of a protrusion on the bottom portion of the spacer holder portion 44, a depression into which an excess portion of the thermally softened spacer 30 enters can be formed, while the spacer 30 is supported with respect to the thrust direction. However, in the case of FIG. 11, since thrust adjustment is of a slight extent, the shape of the spacer 30 or spacer holder portion 44 may be selected such that a slight gap is formed between the spacer 30 and the spacer holder portion 44, thereby enabling thrust adjustment.

INDUSTRIAL APPLICABILITY

As described above, according to the present invention, thrust adjustment for the motor shaft 4 is performed through application of thrust to the motor shaft 4 after the resin spacer is softened through induction heating effected electromagnetically from outside the gear case, or after the gear case protrusion is softened through application of heat transmitted from the abutting metallic spacer heated through induction heating effected electromagnetically from outside the gear case. Thus, assembly work can be performed while the motor shaft is fixedly positioned accurately with respect to the thrust direction by means of a simple structure. Further, except for reception of the bearing holder, the gear case cavity portion does not communicate with the exterior thereof through, for example, a through-hole, thereby providing a small-sized motor equipped with a worm reducer capable of preventing entry of water from the outside to thereby avoid potential quality-related troubles and impart high reliability and a method of manufacturing the motor as well as providing an actuator operated by a small-sized motor equipped with a worm reducer and a method of manufacturing the actuator.

What is claimed is:

1. A small-sized motor equipped with a worm reducer, the motor being adapted to deliver output from a motor shaft through the worm reducer and comprising:

a cavity portion for receiving a front end of the motor shaft in a gear case which accommodates a worm connected to the motor shaft and a worm wheel engaged with the worm such the cavity portion does not communicate with the exterior of the gear case; and a protrusion arranged on an inside of said cavity to form a depression;

a bearing holder and a spacer disposed in the cavity portion, the bearing holder including a bearing for the motor shaft, and the spacer being formed of a metallic-fiber-containing resin, located on the side of the bearing holder opposite the motor shaft, disposed between the bearing holder and the gear case, and adapted to be softened through electromagnetic induction heating and enter said depression.

2. A small-sized motor equipped with a worm reducer, the motor being adapted to deliver output from a motor shaft through the worm reducer and comprising:

a cavity portion for receiving a front end of the motor shaft in a gear case which accommodates a worm connected to the motor shaft and a worm wheel engaged with the worm, such that the cavity portion does not communicate with the exterior of the gear case;

a bearing holder and a metallic spacer disposed in the cavity portion, the bearing holder including a radial bearing and a thrust bearing for the motor shaft, and the metallic spacer being located on the side of the bearing holder opposite the motor shaft, disposed between the bearing holder and the gear case, and adapted to be heated through electromagnetic induction; and a protrusion abutting the spacer formed on the inside of the gear case and crushed after being softened through application of heat transmitted from the spacer when the spacer is heated.

3. A method of manufacturing a small-sized motor equipped with a worm reducer, the motor being adapted to deliver output from a motor shaft through the worm reducer, the method comprising the steps of:

forming a cavity portion for receiving a front end of the motor shaft in a gear case, which accommodates a worm connected to the motor shaft and a worm wheel engaged with the worm, such that the cavity portion does not communicate with the exterior of the gear case;

disposing in the cavity portion a bearing holder including a radial bearing and a thrust bearing for the motor shaft, and a spacer formed of a metallic-fiber-containing resin, the spacer being located on the side of the bearing holder opposite the motor shaft, and disposed between the hearing holder and the gear case;

forming a protrusion abutting the spacer on the inside of the gear case to thereby form a depression; and applying thrust to the motor shaft after the spacer is softened through induction heating effected electromagnetically from outside the gear case, to thereby perform thrust adjustment for the motor shaft, said spacer entering said depression during said heating and said applying of thrust.

4. A method of manufacturing a small-sized motor equipped with a worm reducer, the motor being adapted to deliver output from a motor shaft through the worm reducer, the method comprising the steps of:

forming a cavity portion for receiving a front end of the motor shaft in a gear case which accommodates a worm connected to the motor shaft and a worm wheel engaged with the worm, such that the cavity portion does not communicate with the exterior of the gear case;

disposing in the cavity portion a bearing holder including a bearing for the motor shaft, and a metallic spacer which is located on the side of the bearing holder opposite the motor shaft and is disposed between the bearing holder and the gear case; and forming a protrusion on the inside of the gear case such that the protrusion abuts the spacer and crushing the protrusion through application of thrust to the motor shaft after the protrusion is softened through application of heat transmitted from the spacer heated through induction heating effected electromagnetically from outside the gear case, to thereby perform thrust adjustment for the motor shaft.

5. An actuator, which is operated by a small-sized motor equipped with a worm reducer, the actuator comprising:

an actuator box which accommodates and supports the small-sized motor equipped with a worm reducer; and a bearing portion for supporting a motor shaft with respect to the thrust direction on the inner wall of the actuator box at a position corresponding to the front end portion of the shaft of the small-sized motor supported within the actuator box;

the bearing portion including a resin spacer which contains metallic fibers and is melted through heating, and a spacer holder portion formed on the inner wall of the actuator box and adapted to support the resin spacer, one of said spacer and said spacer holder portion is shaped to define a gap between said spacer and said spacer holder portion to enable thrust adjustment.

6. A method of manufacturing an actuator, which is operated by a small-sized motor equipped with a worm reducer, the method comprising the steps of:

preparing an actuator box which accommodates and supports the motor equipped with a worm reducer;

forming a spacer holder portion on the inner wall of the actuator box at a position corresponding to a front end portion of the motor shaft of the small-sized motor supported within the actuator box:

press-fitting a metallic-fiber-containing resin spacer into the spacer holder portion against the motor shaft, one of said spacer and said spacer holder portion is shaped to define a gap between said spacer and said spacer holder portion to enable thrust adjustment; and softening the resin spacer through induction heating effected by means of an electromagnetic induction coil disposed outside the actuator box to thereby be released from the pressed condition.

7. A method for forming a worm gear arrangement, the method comprising the steps of:

providing a gear case defining a cavity, said gear case including a protrusion in said cavity;

providing a spacer in said cavity adjacent said protrusion;

providing a bearing holder in said cavity adjacent a side of said spacer diametrically opposite said protrusion;

providing a bearing in said bearing holder;

providing a shaft with a worm gear;

inserting an end of said shaft into said bearing and into said cavity;

softening one of said protrusion and said spacer through induction heating effected electromagnetically from an outside of said gear case;

applying force to said shaft during said softening to perform thrust adjustment for the shaft.

8. The method in accordance with claim 7, further comprising:

sealing said cavity from an exterior of said gear case.

9. The method in accordance with claim 7, wherein:

said softening softens said protrusion.

10. The method in accordance with claim 9, wherein:

said protrusion has a lower melting portion than said bearing holder.

11. The method in accordance with claim 7, wherein:

said softening softens said spacer.

12. The method in accordance with claim 11, wherein:

said spacer has a lower melting portion than said gear case and said bearing holder.

13. The method in accordance with claim 7, further comprising:

hardening said one of said protrusion and said spacer to fix said thrust adjustment.

* * * * *